United States Patent
Daynes

(10) Patent No.: US 7,756,912 B2
(45) Date of Patent: Jul. 13, 2010

(54) METHOD AND SYSTEM FOR MINOR GARBAGE COLLECTION IN A MULTITASKING ENVIRONMENT

(75) Inventor: Laurent Philippe Daynes, Saint-Ismier (FR)

(73) Assignee: Oracle America, Inc., Redwood City, CA (US)

( * ) Notice: Subject to any disclaimer, the term of this patent is extended or adjusted under 35 U.S.C. 154(b) by 347 days.

(21) Appl. No.: 11/864,849

(22) Filed: Sep. 28, 2007

(65) Prior Publication Data

US 2009/0089345 A1 Apr. 2, 2009

(51) Int. Cl.
*G06F 17/30* (2006.01)
(52) U.S. Cl. ...................................................... 707/813
(58) Field of Classification Search .......... 707/999.001, 707/999.1, 999.2, 999.206
See application file for complete search history.

(56) References Cited

OTHER PUBLICATIONS

John H. Reppy, A High-performance Garbage Collector for Standard ML, Dec. 1993, AT&T Bell Laboratories, pp. 1-20.*
Sunil Soman et al., Task-Aware Garbage Collection in a Multi-Tasking Virtual Machine, ACM, Jun. 10-11, 2006, pp. 64-73.*

* cited by examiner

*Primary Examiner*—Fred I Ehichioya
(74) *Attorney, Agent, or Firm*—Osha • Liang LLP

(57) ABSTRACT

A method for minor garbage collection in a multitasking environment involves marking cards as clean, where the cards designate ranges of memory locations in a shared older generation. The method further involves marking a card as dirty when a reference field of an object within the card is modified, where a memory location of the reference field is designated by the card, where the reference field references a live young object in a task-specific young generation, and where the task-specific young generation is associated with a first task. The method further involves marking the card as single-dirty when the card only includes roots of live young objects in the task-specific young generation, and optimizing task-specific minor garbage collection for a second task by skipping the card when the card is marked as single-dirty.

15 Claims, 4 Drawing Sheets

METHOD AND SYSTEM FOR MINOR GARBAGE COLLECTION IN A MULTITASKING ENVIRONMENT

CROSS-REFERENCE TO RELATED APPLICATIONS

Subject matter contained in the present application may be related to subject matter contained in copending U.S. patent application Ser. No. 11/705,361, entitled "Method and System for Minor Garbage Collection," filed Feb. 12, 2007, and U.S. patent application Ser. No. 11/705,378, entitled "Method and System for Garbage Collection in a Multitasking Environment," filed Feb. 12, 2007. Both of the referenced applications have an inventor in common with the present application. Further, both applications are commonly owned by the same assignee, and are hereby incorporated by reference in their entirety.

BACKGROUND

In computer systems, garbage collection refers to automated memory reclamation. Specifically, a garbage collector is a process that differentiates between live objects (i.e., objects that are still in use) and dead objects (i.e., objects that are no longer in use). Differentiating between live objects and dead objects typically involves traversing a graph of live objects to identify objects that should not be discarded.

Once live objects are identified, the garbage collector frees memory occupied by dead objects, and the freed memory is then available for other uses. In contrast, manual memory reclamation requires software developers to write code to explicitly free memory when objects are no longer needed. Errors in manual memory reclamation code may result in unnecessarily large memory footprints, memory leaks, etc. Thus, garbage collection reduces the probability of such errors occurring.

Garbage collection may be used in many different operating environments. For example, garbage collection may be used in a multitasking environment. A task is a set of executable instructions loaded into memory, and multitasking refers to situations in which multiple tasks are loaded into memory simultaneously. Specifically, each task is an isolated unit of execution and generally cannot access objects associated with other tasks. If a computer system includes only a single processor, only a single task can execute at a time. Still, execution may transfer from one task to another. For example, execution may transfer if an executing task reaches a stopping point, if a pending task has higher priority, if a maximum execution time is reached for an executing task, etc. In multi-processor computer systems, tasks may execute on each processor concurrently.

SUMMARY

In general, in one aspect, the invention relates to a method for minor garbage collection in a multitasking environment. The method comprises marking a plurality of cards as clean, wherein the plurality of cards designates ranges of memory locations in a shared older generation. The method further comprises marking a card selected from the plurality of cards as dirty when a reference field of an object within the card is modified, wherein a memory location of the reference field is designated by the card, wherein the reference field references a live young object in a task-specific young generation selected from a plurality of task-specific generations, and wherein the task-specific young generation is associated with a first task selected from a plurality of tasks. The method further comprises marking the card as single-dirty when the card only includes roots of live young objects in the task-specific young generation, and optimizing task-specific minor garbage collection for a second task selected from the plurality of tasks by skipping the card when the card is marked as single-dirty.

In general, in one aspect, the invention relates to a system comprising a plurality of task-specific young generations for storing young objects associated with a plurality of tasks, a shared older generation for storing promoted objects associated with the plurality of tasks, and a garbage collector. The garbage collector is configured to perform minor garbage collection by marking a plurality of cards as clean, wherein the plurality of cards designates ranges of memory locations in the shared older generation. The garbage collector is further configured to perform minor garbage collection by marking a card selected from the plurality of cards as dirty when a reference field of an object within the card is modified, wherein a memory location of the reference field is designated by the card, and wherein the reference field references a live young object in a task-specific young generation selected from the plurality of task-specific generations. The garbage collector is further configured to perform minor garbage collection by marking the card as single-dirty when the card only includes roots of live young objects in the task-specific young generation, and optimizing task-specific minor garbage collection for a second task selected from the plurality of tasks by skipping the card when the card is marked as single-dirty.

In general, in one aspect, the invention relates to a computer readable medium comprising executable instructions for minor garbage collection in a multitasking environment. The executable instructions comprise instructions to mark a plurality of cards as clean, wherein the plurality of cards designates ranges of memory locations in a shared older generation. The executable instructions further comprise instructions to mark a card selected from the plurality of cards as dirty when a reference field of an object within the card is modified, wherein a memory location of the reference field is designated by the card, wherein the reference field references a live young object in a task-specific young generation selected from a plurality of task-specific generations, and wherein the task-specific young generation is associated with a first task selected from a plurality of tasks. The executable instructions further comprise instructions to mark the card as single-dirty when the card only includes roots of live young objects in the task-specific young generation, and optimize task-specific minor garbage collection for a second task selected from the plurality of tasks by skipping the card when the card is marked as single-dirty.

Other aspects of the invention will be apparent from the following description and the appended claims.

DETAILED DESCRIPTION

Figure 1:
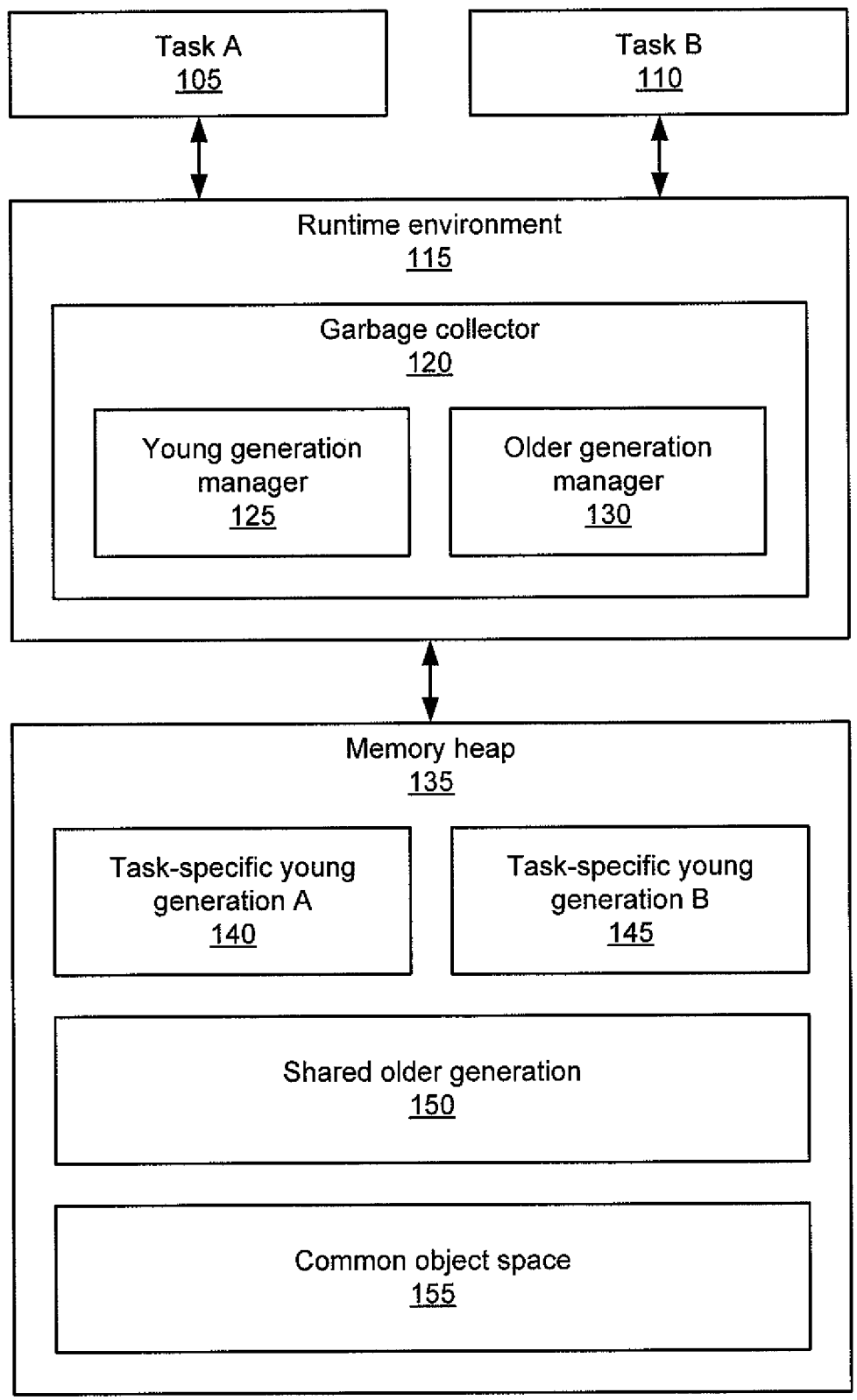
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for minor garbage collection in a multitasking environment. Tasks are assigned task-specific young generations and share an older generation. Cards designating ranges of memory locations in the shared older generation are initially marked as clean. As reference fields of objects in the shared older generation are updated, the corresponding cards are marked as dirty. During garbage collection, if a card only includes references to objects in one task-specific young generation, then the card is marked as single-dirty. Single-dirty cards are skipped during task-specific minor garbage collections for tasks that are not identified by the single-dirty marking.

For ease of discussion, embodiments of the invention are discussed herein using a single shared older generation. However, those skilled in the art will appreciate that multiple older generations may exist, some of which may not be shared between tasks. Specifically, in one or more embodiments, multiple older generations (whether shared or not) allow multiple levels of generational garbage collection. Accordingly, the scope of the invention should be not be considered limited to only a single older generation.

FIG. 1 shows a diagram of a system in accordance with one or more embodiments of the invention. A runtime environment (115) is configured to execute task A (105) and task B (110). Task A (105) and task B (110) may be any type of executable task, and may belong to the same software application or to different software applications. Further, the runtime environment (115) may be a Java™ virtual machine, a Microsoft® .NET framework, an operating system, or any other runtime environment that supports garbage collection. Java™ is a trademark of Sun Microsystems, Inc. located in Santa Clara, Calif. Microsoft® is a registered trademark of Microsoft Corporation located in Redmond, Wash.

In one or more embodiments, memory used by task A (105) and task B (110) is allocated to a memory heap (135). Specifically, the runtime environment (115) is configured to manage allocation of the memory heap (135) for task A (105) and task B (110). More specifically, the runtime environment (115) is configured to designate areas of the memory heap (135) for task-specific young generation A (140), task-specific young generation B (145), and a shared older generation (150). The memory heap (135) may include random access memory (RAM), flash memory, any other type of rewritable computer storage, or any combination thereof.

Further, another portion of the memory heap (135) may be designated as common object space (155), i.e., memory for allocating common objects between task A (105) and task B (110). Common object space (155) reduces the amount of memory required when multiple tasks are using the same objects. For example, application programming interface (API) objects provided by the runtime environment (115) may be placed in the common object space (155). Those skilled in the art will appreciate that objects storing task-specific information should generally not be placed in the common object space (155).

In one or more embodiments, the runtime environment (115) includes a garbage collector (120). Specifically, the garbage collector (120) includes one or more modules (e.g., threads, classes, functions, etc.) for performing garbage collection. For example, the garbage collector (120) may include a young generation manager (125) configured to manage allocation of objects to task-specific young generation A (140) and task-specific young generation B (145). Further the garbage collector (120) may include an older generation manager (130) configured to manage allocation of objects to the shared older generation (150).

In one or more embodiments, the use of task-specific young generations allows for task-specific minor garbage collections. Thus, a minor garbage collection may be performed for one task, while another task continues to execute. Further, execution pauses (caused by task-specific minor garbage collections) are proportional to the number of objects stored in the task-specific young generation, rather than the number of objects in all young generations.

Moreover, because young objects belonging to separate tasks are isolated from each other, memory occupied by a task-specific young generation may be reclaimed when the task terminates, without performing a minor collection. Specifically, memory used by the task-specific young generation may be made available for use by other tasks.

In addition, task-specific young generations allow for the young generations to be sized according to each task's needs, which may reduce the amount of memory required for multitasking. Moreover, parameters related to minor garbage collections (e.g., promotion criteria, collection frequency, etc.) may be assigned on a per-task basis, thereby tailoring minor garbage collection according to each task's needs.

Task-specific young generations may take many forms. For example, each task-specific young generation may be assigned a set of non-contiguous chunks allocated from a pool of fixed size chunks. Alternatively, each task-specific young generation may be assigned a single contiguous region from a large contiguous range of virtual address space reserved for young generations.

Figures 2, 3:
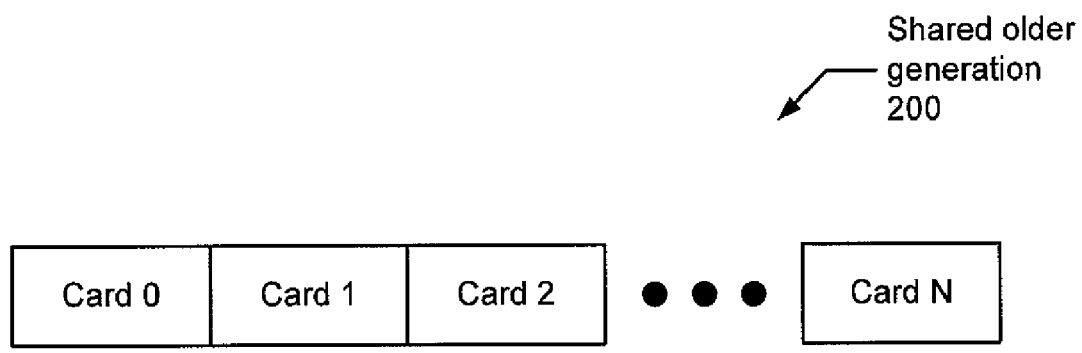
FIG. 2 shows a diagram of a shared older generation in accordance with one or more embodiments of the invention.
FIG. 3 shows a diagram of a card table in accordance with one or more embodiments of the invention.

In one or more embodiments, the shared older generation is a single contiguous region of memory, logically separated into 'cards.' FIG. 2 shows a diagram of a shared older generation (200) in accordance with one or more embodiments of the invention. Specifically, the shared older generation (200) is logically separated into N cards (card 0 through card N), each of equal size.

At runtime, each card in the shared older generation (200) is initially marked as clean. Further, a "write barrier" is imposed for reference field updates in the shared older generation (200). Thus, when a reference field of an object in the shared older generation (200) is modified, the write barrier is executed and the card corresponding to the object's memory location is marked as dirty. In some cases, a write barrier may also be executed when promoting an object from a task-specific young generation to the shared older generation (200), or in any other situation where a root of a live young object may be added and/or modified in the shared older generation (200).

In one or more embodiments, to be marked as clean, a card must not contain any references to a task-specific young generation. During minor garbage collection, only dirty cards are scanned to identify roots of live young objects. In this manner, minor garbage collection does not unnecessarily scan cards that cannot possibly contain references to a task-specific young generation. Further, in one or more embodiments of the invention, cards are marked as single-dirty when the cards only include roots of live young objects in a single task-specific young generation. As discussed in detail below, single-dirty markings further reduce the amount of scanning required during task-specific minor-garbage collection.

As noted above, the cards in the shared older generation (200) are of equal size. Specifically, in one or more embodiments, all cards are sized equally according to the same power of two (e.g., 1024 bytes), with the address of the first card in the card table being aligned with the given power of two. Further, entries in the card table, when combined, may reference the entire range of heap memory. Moreover, the task-specific young generations and the shared older generation (200) may all be located in contiguous regions of the heap.

If all of the aforementioned conditions are satisfied, then the relationships (using byte shift operations) shown in Table 1 are also satisfied, where CARD_SIZE is the aforementioned power of two, START_OF_HEAP is the memory address of the start of the heap, and CARD_ADDRESS_i is the memory address of the card at index i in the card table.

TABLE 1

Shift Operations

CARD_SIZE = 1 << CARD_SHIFT
START_OF_HEAP = n * CARD_SIZE
CARD_ADDRESS_i = START_OF_HEAP + i * CARD_SIZE
CARD_TABLE_BASE = CARD_TABLE_ADDRESS − n

Based on the relationships shown in Table 1, a write barrier for card marking may be implemented as shown in Table 2.

TABLE 2

Write Barrier Using a Shift Operation

CARD_TABLE_BASE [OBJECT_REFERENCE >> CARD_SHIFT] = 0

Those skilled in the art will appreciate that many different ways of implementing card tables exist. In one or more embodiments, the use of a byte array and shift operations as described above minimizes the number of machine instructions required for each execution of the write barrier.

Cards may be implemented as lists, tables, database entries, or any other similar type of data structure. However, to accommodate a single-dirty marking scheme, the cards must accommodate multiple values. For example, a card may be implemented as an Integer, a text variable, or any other similar type of variable. In one or more embodiments, a card table is implemented as an array of bytes, where each byte corresponds to a different card. In such cases, each type of marking is indicated by a unique byte value (e.g., 00000000, 00000001, etc.).

FIG. 3 shows a diagram of a card table (300) in accordance with one or more embodiments of the invention. The card table (300) corresponds to the shared older generation (200) of FIG. 2, and includes examples of card markings implemented as byte values. For example, the value 11111111 (255 in decimal) assigned to card 0 and card N may indicate that the cards are clean. Further, the value 00000000 (0 in decimal) assigned to card 1 may indicate that the card is dirty.

In one or more embodiments of the invention, values between 00000000 and 11111111 (0 and 255 in decimal) are reserved for single-dirty markings that uniquely identify each of the task-specific young generations. For example, the value 00100011 (35 in decimal) assigned to card 2 may indicate that card 2 is single-dirty and only contains root of live young objects in the task-specific young generation associated with task 35. Those skilled in the art will appreciate that card tables may be implemented in many different ways.

Figure 4:
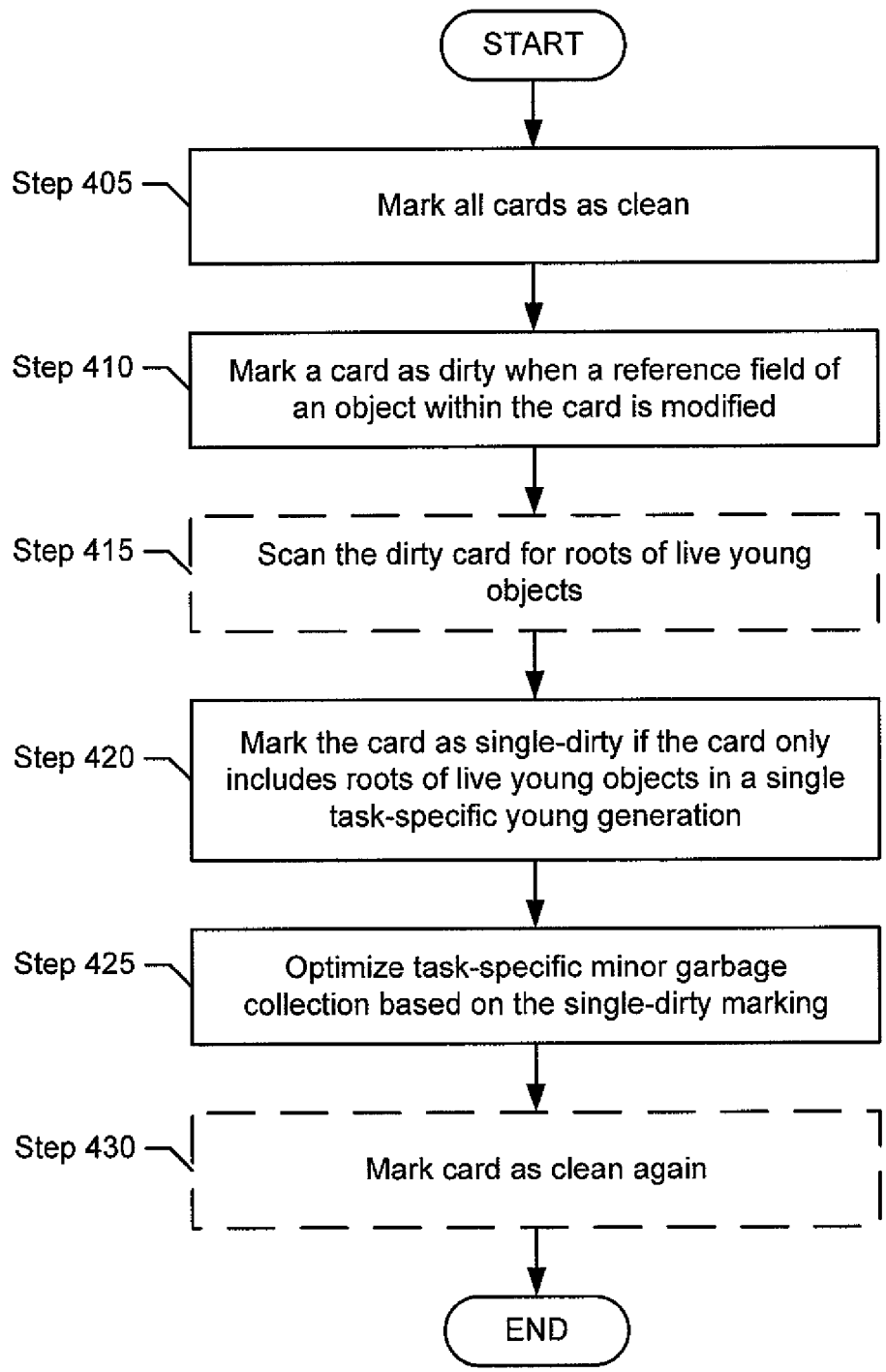
FIG. 4 shows a flowchart of a method for minor garbage collection in accordance with one or more embodiments of the invention.

FIG. 4 shows a flowchart of a method for minor garbage collection in accordance with one or more embodiments of the invention. In one or more embodiments, one or more of the steps shown in FIG. 4 may be omitted, repeated, and/or performed in a different order than the order shown in FIG. 4. Accordingly, embodiments of the invention should not be considered limited to the specific ordering of steps shown in FIG. 4.

Initially, in Step 405, all cards associated with the shared older generation are initialized as clean. Specifically, each card is considered clean until a reference field of an object in the shared older generation is modified at a memory location designated by the card. In Step 410, as reference fields are modified in the shared older generation, the corresponding cards are marked as dirty. The dirty markings serve to track regions of memory where roots of live young objects may have been added and/or modified since the cards were last marked as clean.

In one or more embodiments, in Step 415, a dirty card is scanned to identify roots of live young objects. That is, reference fields within the range of the dirty card are examined to determine whether the reference fields reference live young objects in a task-specific young generation. In Step 420, the dirty card is marked as single-dirty if the card only includes roots of live young objects in a single task-specific young generation. For example, using the card table implementation shown in FIG. 3, the card table entry for the card being scanned is updated with the unique identifier of the task-specific young generation (e.g., a specific byte value).

Alternatively, single-dirty cards may be identified when objects are promoted from a task-specific young generation to the shared older generation. For example, if many objects associated with a single task are promoted at the same time, the objects may fully occupy one or more cards in the shared older generation. Thus, based on the size of the objects being promoted, it may be possible to mark the destination card(s) as single dirty immediately upon promotion.

In Step 425, a task-specific minor garbage collection is optimized based on the single-dirty marking. The purpose of a task-specific minor garbage collection is to free dead objects associated only with a particular task. Therefore, if a minor garbage collection is being performed for a particular task, but the single-dirty marking is not associated with that task, then the single-dirty card does not need to be scanned for roots of live young objects. In other words, the single-dirty card only needs to be scanned during minor garbage collection for the specific task that is associated with the single-dirty marking. All other tasks can ignore the single-dirty card without any risk of missing relevant objects. However, if a card is simply marked as dirty (as opposed to single-dirty), then the card must still be scanned for all tasks, because a dirty marking does not provide any information about the specific task(s) for which reference fields have changed in the card.

In one or more embodiments, in Step 430, the card is marked as clean again. Cards may be marked as clean under a variety of circumstances. For example, all dirty (or single-dirty) cards may be marked as clean prior to a full garbage collection (i.e., a garbage collection for all tasks). Specifically, during a full garbage collection, the object hierarchy is traversed and a write barrier is executed for those objects containing references to live young objects. Thus, after a full garbage collection, cards that were incorrectly marked as dirty (e.g., if a reference field was modified but did not reference a young object) are no longer marked as dirty. Correcting the card markings in this manner allows for more efficient minor garbage collections between full garbage collections. As another example, a dirty (or single-dirty) card may be marked as clean again if a minor garbage collection shows that the card does not reference any roots of live young objects. In view of the above, those skilled in the art will appreciate that cards may be marked as clean again under many different circumstances.

In one or more embodiments, using the method for task-specific minor garbage collection discussed above decreases the amount of overhead (e.g., time, processing cycles, etc.) required to perform a minor garbage collection, by limiting the scope of the shared older collection to be scanned for roots of live young objects. Specifically, the use of single-dirty markings allows used memory to be freed more quickly than if binary clean/dirty markings are relied upon exclusively.

Figure 5:
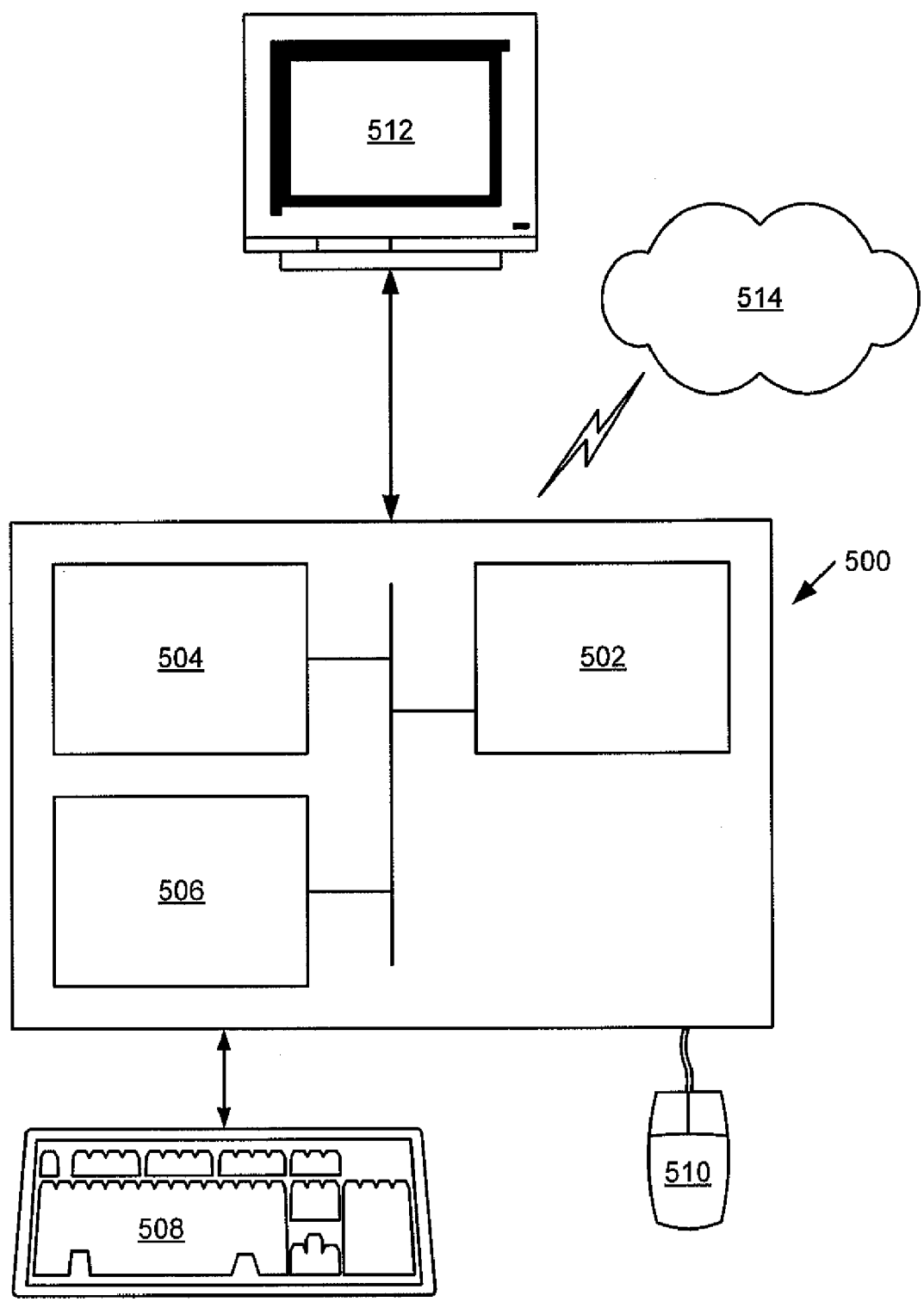
FIG. 5 shows a diagram of a computer system in accordance with one or more embodiments of the invention.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) may be connected to a network (514) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., task, runtime environment, garbage collector, young generation manager, older generation manager, memory heap, task-specific young generation, shared older generation, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for minor garbage collection in a multitasking environment comprising:
   marking, by a processor, a plurality of cards as clean, wherein the plurality of cards designates ranges of memory locations in a shared older generation;
   marking, by the processor, a card selected from the plurality of cards as dirty when a reference field of an object within the card is modified,
   wherein a memory location of the reference field is designated by the card,
   wherein the reference field references a live young object in a task-specific young generation selected from a plurality of task-specific generations, and
   wherein the task-specific young generation is associated with a first task selected from a plurality of tasks;
   marking, by the processor, the card as single-dirty when the card only includes roots of live young objects in the task-specific young generation, wherein marking the card as single-dirty comprises recording a unique identifier associated with the first task, wherein the unique identifier is a byte comprising a plurality of possible values, and wherein the plurality of possible values is associated with dirty, clean, and the plurality of tasks; and
   optimizing, by the processor, task-specific minor garbage collection for a second task selected from the plurality of tasks by skipping the card when the card is marked as single-dirty.

2. The method of claim 1, further comprising:
   including the card during task-specific minor garbage collection for the first task when the card is marked as single-dirty.

3. The method of claim 1, further comprising:
   including the card during task-specific minor garbage collection for the second task when the card is marked as dirty.

4. The method of claim 1, further comprising:
   scanning the card to identify roots of live young objects when the card is marked as dirty, wherein marking the card as single-dirty is performed based on information gathered while scanning the card.

5. The method of claim 1, wherein marking the card as single-dirty is performed when the card is filled with promoted objects associated with the first task.

6. A system comprising:
   a processor;
   a memory comprising:
      a plurality of task-specific young generations for storing young objects associated with a plurality of tasks; and
      a shared older generation for storing promoted objects associated with the plurality of tasks; and
   a garbage collector executing on the processor and configured to perform minor garbage collection by:
      marking a plurality of cards as clean, wherein the plurality of cards designates ranges of memory locations in the shared older generation;
      marking a card selected from the plurality of cards as dirty when a reference field of an object within the card is modified,
         wherein a memory location of the reference field is designated by the card, and
         wherein the reference field references a live young object in a task-specific young generation selected from the plurality of task-specific generations;
      marking the card as single-dirty when the card only includes roots of live young objects in the task-specific young generation, wherein marking the card as single-dirty comprises recording a unique identifier associated with the first task, wherein the unique identifier is a byte comprising a plurality of possible values, and wherein the plurality of possible values is associated with dirty, clean, and the plurality of tasks; and optimizing task-specific minor garbage collection for a second task selected from the plurality of tasks by skipping the card when the card is marked as single-dirty.

7. The system of claim 6, wherein the garbage collector is further configured to perform minor garbage collection by:
   including the card during task-specific minor garbage collection for the first task when the card is marked as single-dirty.

8. The system of claim 6, wherein the garbage collector is further configured to perform minor garbage collection by:
   including the card during task-specific minor garbage collection for the second task when the card is marked as dirty.

9. The system of claim 6, wherein the garbage collector is further configured to perform minor garbage collection by:
   scanning the card to identify roots of live young objects when the card is marked as dirty, wherein marking the card as single-dirty is performed based on information gathered while scanning the card.

10. The system of claim 6, wherein the garbage collector is configured mark the card as single-dirty when the card is filled with promoted objects associated with the first task.

11. A computer readable medium comprising executable instructions for minor garbage collection in a multitasking environment, wherein the executable instructions comprise instructions to:
   mark a plurality of cards as clean, wherein the plurality of cards designates ranges of memory locations in a shared older generation;
   mark a card selected from the plurality of cards as dirty when a reference field of an object within the card is modified,
      wherein a memory location of the reference field is designated by the card,
      wherein the reference field references a live young object in a task-specific young generation selected from a plurality of task-specific generations, and
      wherein the task-specific young generation is associated with a first task selected from a plurality of tasks;
   mark the card as single-dirty when the card only includes roots of live young objects in the task-specific young generation, wherein instructions to mark the card as single-dirty comprise instructions to record a unique identifier associated with the first task, wherein the unique identifier is a byte comprising a plurality of possible values, and wherein the plurality of possible values is associated with dirty, clean, and the plurality of tasks; and
   optimize task-specific minor garbage collection for a second task selected from the plurality of tasks by skipping the card when the card is marked as single-dirty.

12. The computer readable medium of claim 11, wherein the executable instructions further comprise instructions to:
   include the card during task-specific minor garbage collection for the first task when the card is marked as single-dirty.

13. The computer readable medium of claim 11, wherein the executable instructions further comprise instructions to:
   include the card during task-specific minor garbage collection for the second task when the card is marked as dirty.

14. The computer readable medium of claim 11, wherein the executable instructions further comprise instructions to:
   scan the card to identify roots of live young objects when the card is marked as dirty, wherein instructions to mark the card as single-dirty are executed based on information gathered while scanning the card.

15. The computer readable medium of claim 11, wherein instructions to mark the card as single-dirty are executed when the card is filled with promoted objects associated with the first task.

* * * * *